Patented Apr. 1, 1930

1,753,170

UNITED STATES PATENT OFFICE

GERD KOCHENDOERFER, OF FRANKFORT-ON-THE-MAIN, GERMANY, ASSIGNOR TO DEUTSCHE GOLD & SILBER SCHEIDEANSTALT, VORMALS ROESSLER, OF FRANKFORT-ON-THE-MAIN, GERMANY, A CORPORATION

PROCESS FOR INTRODUCTION OF IODINE INTO PYRIDINE DERIVATIVES

No Drawing. Application filed February 1, 1926, Serial No. 85,387, and in Germany January 24, 1925.

The object of this invention is the production of iodated pyridine derivatives.

The methods previously used for the production of these compounds have been to cause the introduction of the iodine to take place in acid solutions. These methods, however, are unsatisfactory because of the low yields obtained and the impurity of the product.

I have now found that it is possible to iodate these substituted pyridine compounds by carrying out the reaction under neutral or weakly alkaline conditions and that the reaction proceeds more smoothly and efficiently than the acid reaction. I produce my results by first preparing a mixture of the substituted pyridine compound such as aminopyridine or hydroxy pyridine, and iodine, or an iodine compound which will liberate iodine in the subsequent treatment. To this mixture I add the salt of a weak acid such as carbonic acid or boric acid. This salt is added in sufficient quantity to neutralize the hydriodic acid set free during the reaction.

As a source of iodine I have found that I can use elemental iodine, iodine chloride, etc. The reaction can be carried on with or without solvents. Suitable solvents are for instance water or pyridine. Raising the temperature assists the reaction but this is not a necessity since the reaction proceeds satisfactorily at ordinary temperature.

Example I 188 grams α-amino-pyridine are melted on the water bath and mixed with 100 grams potassium carbonate. To the pasty mass 510 grams iodine are added in small portions whilst the reaction mixture is agitated frequently.

After the vigorous liberation of carbon dioxide has ceased another 30 grms. potassium carbonate are added with stirring. After heating for one to one and a half hours on the water bath the reaction mass is diluted with 1000 cc. water whereby the reaction product is obtained in dark solid lumps. A small quantity of potassium hydroxide solution (one part KOH and one part water) is added. The deposit is then filtered by suction and crystallized from 27 to 30 liters of boiling water with the addition of a little animal charcoal. 194–196 grams α-amino-β' iodo pyridine

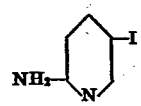

of a snow white color which is quite pure are obtained.

2. 140 grms. α-hydroxy-β' nitro pyridine are heated with 1000 cc. water and 140 grms. $K_2CO_3$ upon the water bath with a reflux condenser. 254 grms. iodine are added in one quantity whereby a vigorous reaction is caused. 15 minutes after the reaction has stopped the mass is heated up to boiling point. It is then allowed to cool down and the crystal cake is aspirated. The latter is dissolved in 3000–4000 cc. of water with addition of a small quantity of KOH (1 KOH : 1 water) boiled with a little animal charcoal and precipitated while still hot by adding glacial acetic acid. Yield 195 grms. 2-hydroxy 3 iod-5 nitro pyridine

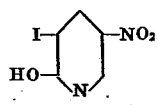

Fusion point 203° C. The product dissolves with difficulty in boiling water and low boiling organic solvents. It is however fairly soluble in hot alcohol of 50% and high boiling solvents such as tetralin, at higher temperatures. It is easily dissolved by very dilute alkali solution. It is not vaporized with steam.

3. 19 grms. α-hydroxy pyridine, 15 grms. potassium carbonate and 51 grms. iodine are melted on the water bath. After the reaction has ceased the mass is made alkaline by means of potassium hydrate solution. It is then heated to boiling point and precipitated with hydrochloric acid in the presence of sulphurous acid. The crude product is recrystallized from glacial acetic acid and fuses at 275° C. Yield 16 grms. It is identical with the di-iodo hydroxy pyridine

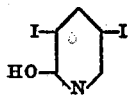

obtained by Pfeiffer from quinoline acid (see Berichte vol. 20, p. 1352).

What I claim is:

1. Process for the iodation of an α-substituted pyridine, which consists in reacting iodine with said pyridine under weakly alkaline conditions.

2. Process for the iodation of an α-substituted pyridine, which consists in reacting iodine with said pyridine in the presence of sufficient alkali metal carbonate to neutralize the hydriodic acid formed during the reaction.

3. Process for the iodation of an α-substituted pyridine, which consists in reacting iodine with said pyridine in the presence of the salt of a weak acid capable of neutralizing the liberated hydriodic acid as formed.

4. Process for the iodation of α-amino-pyridine, which consists in reacting said compound with iodine under weakly alkaline conditions.

5. Process for the iodation of α-amino-pyridine, which consists in reacting said compound with iodine in the presence of the salt of a weak acid capable of neutralizing the liberated hydriodic acid as formed.

6. Process for the iodation of α-amino-pyridine which consists in reacting said compound with iodine in the presence of sufficient alkali metal carbonate to neutralize the hydriodic acid formed during the reaction.

Dr. GERD KOCHENDOERFER.